United States Patent Office 2,768,900
Patented Oct. 30, 1956

2,768,900

METHOD OF PREPARING DRIED APPLES, PEARS, ETC.

Ralph B. Vertner, Selah, Wash., assignor to Ross Packing Co., Selah, Wash., a firm No Drawing. Application January 26, 1953,
Serial No. 333,356

4 Claims. (Cl. 99—204)

My invention relates to improvements in methods of preparing dried fruit products, such as apples, pears, etc.

Briefly and generally stated, the invention has for its primary object the provision of a novel and highly efficient method of so preparing dried, segmented fruit of the class noted that it can be readily and uniformally reconstituted by rehydration to closely simulate fresh fruit, and which will cook uniformly in pies, etc., or alone, to produce a cooked product substantially duplicating that produced from fresh fruit.

It is also an object of the invention to produce a dried fruit product which is especially suitable for use as a filler for small pies, tarts, and the like.

Still another object of the invention is to produce a segmented dried fruit product of the variety mentioned in different sizes and which in small size will mean many more units of fruit to the pound than has been possible utilizing heretofore known methods.

Other objects and advantages of the novel method will be understood and appreciated by those versed in the art as the description proceeds, the invention residing in various method steps and groups thereof as claimed hereinafter.

Inasmuch as uniformity in the dried product is necessary to achieve uniformity in the cooked product, the various steps of the method which is followed are calculated to maintain uniformity of the fruit product at the completion of each step in the process.

Therefore, in carrying out the invention, and for purposes of discussion using apples as the product, I make use of only straight varieties of apples, orchard run and hand picked. A batch of apples as specified is held in storage until the entire lot is of uniform maturity. This is necessary as emphasized earlier to insure that the finished product will reconstitute and cook uniformly when used by the cook or baker. Thus, the first step in the process really amounts to the selection and maturing of the fruit as hereinabove noted.

After the apples have fully matured in storage, the fruit is washed, peeled, cored, and cut in halves, care being taken to see that seed cells are removed. The halved fruit then goes to the preparation table for inspection and removal of any blemishes that may still remain on the fruit.

After the inspection step referred to, the halved apples are washed and then diced into predetermined sizes such as ¼" x ¼", ⅜" x ⅜", ½" x ½" etc., or other predetermined sizes depending upon the wishes of the particular buyer.

Following the dicing and a preliminary washing step which may be used, the diced fruit is then passed through or subjected to a mist of sodium sulphite sprays to prevent oxidation of the fruit prior to the drying step. An ordinary perforated belt conveyor can be used to conduct a thin layer of the fruit through such a spray. Although I have mentioned sodium sulphite spray, a spray of other equivalently acting material may be used which will prevent oxidation of the fruit. The spray will preferably comprise a diluted solution of sodium sulphate (or like product) and water.

Following the mist treatment referred to, the diced fruit is dried at temperatures not exceeding 150° F. and the drying operation is carried out until the moisture content of the fruit has been reduced to preferably from 17% to 18% of moisture content, which is to say that the average piece will have moisture content as noted. But since some of the diced pieces will have more moisture content than others and since uniformity of the product is one of the primary objects sought to be obtained, I follow the drying operation or step with a period of storage of the diced fruit in bins, preferably of stainless steel, for a period of from twenty-four to forty-eight hours. This storage period is to allow equalization of moisture throughout the entire batch of diced product.

The next step after the diced product has been thoroughly equalized for moisture is to pass the product use through sprays of water and preferably over screens with small openings of say ¹⁄₁₆ of an inch. The water spray washes away any small pieces of apple and likewise any foreign material such as seeds, etc. that may still be present. The washing step aforenoted also obviously substantially removes absorbed sodium sulphite and has the effect of restoring moisture to the diced product up to say 22½% or 23½% moisture content.

The washed and partially rehydrated product is then packed in cases which are subsequently sealed. The cases may be of various sizes but preferably are twenty-five or fifty pound cases which are popular sizes with the buyer.

The diced fruit product prepared as above described is admirably suited for the requirements of manufacturers and bakers for pies, applesauce cake, mincemeats, etc.

A very distinct advantage of my dried fruit product over dried fruit products as heretofore produced is that mine produces more units of fruit per pound. This is the result of the production of the fruit in diced form which is a dried fruit product has never before been made available. When the product is diced particularly in small pieces such as ¼ inch squares it will run from 3,900 to 4,000 pieces of dried product per pound.

The step of dicing the fruit product is of outstanding importance because it not only makes for more uniform dehydration of the product, but more important, makes for faster reconstitution or rehydration of the product by the cook or manufacturer preparatory to use. The diced product presents not only four surfaces for water absorption, but also since the product is of uniform cross section the absorption of water when the product is being reconstituted will be uniform from each surface.

The diced product in small size, say ¼" x ¼", is particularly suitable for use in the production of small pies, tarts, and the like, in which large lumps of cooked fruit filler would be objectionable.

To reconstitute the fruit product for cooking purposes it is best soaked in water for a period of not less than eight hours or overnight. It can then be employed according to any selected recipe substantially the same as a fresh fruit product, and the cooked resultant product approximates the cooked fresh fruit product.

Having thus described my invention, what I claim is:

1. The method of preparing dried segmented apples and pears so that the product can be reconstituted uniformly by rehydration to simulate a fresh fruit product, and which will cook uniformly in pies, to produce a cooked product which approximates in characteristics that made from fresh fruit; said method comprising storing a batch of orchard run, hand-picked fruit until it has reached a predetermined uniform maturity; subsequently peeling, coring, and halving the fruit, inspecting it for blemishes and washing it; then cutting the halved fruit into squares of predetermined size and as small as ¼ inch, so that a subsequently to be achieved degree of dehydration of the pieces will be substantially uniform and a later to be achieved degree of rehydration of the pieces quickly and uniformly effected; then subjecting the diced pieces of fruit to a sodium sulphate spray to prevent oxidation of same prior to drying; then drying the diced sodium sulphate-spray-treated product in a temperature not exceeding 150 degrees F. until the diced pieces of the mass have an average moisture content of from 17% to 18%; then storing the partially dried product in a container for a period of from twenty-four to forty-eight hours until the moisture content of the individual diced pieces is substantially uniform; then screening the diced product while subjecting it to a water spray to remove any seeds and small pieces of foreign matter in the product and to rehydrate the diced pieces to a moisture content of from 22½% to 23½%; while substantially removing absorbed sodium sulphate and finally packing the product at approximately said last-mentioned moisture content in sealed containers for the user.

2. The method of preparing segmented apples and pears so that the product can be reconstituted uniformly by rehydration to simulate a fresh fruit product, and which will cook uniformly in pies to produce a cooked product which approximates in characteristics that made from fresh fruit; said method comprising the cutting of the peeled and cored fruit into squares of predetermined size and as small as ¼ inch, so that a substantially uniform, subsequently to be achieved degree of dehydration of the pieces and a later substantially uniform rehydration of them can be readily effected; then subjecting the diced fruit to a spray of oxidation-preventing liquid to prevent the product from oxidizing prior to a subsequent drying step; then drying the diced spray-treated product in a temperature not exceeding 150 degrees F. until the diced pieces of the mass have an average moisture content of from 17% to 18%; then storing the partially dried product in a container for a period of from twenty-four to forty-eight hours until the moisture content of the individual diced pieces is substantially uniform; then screening the diced produce while subjecting it to a water spray to remove any seeds and small pieces of foreign matter in the product and to rehydrate the diced pieces to a moisture content of from 22½% to 23½% while substantially removing absorbed oxidation preventing matter and finally packing the product at approximately said last-mentioned moisture content in sealed containers for the user.

3. The method of preparing segmented apples and pears so that the product can be reconstituted uniformly by rehydration to simulate a fresh fruit product, and which will cook uniformly in pies to produce a cooked product which approximates in characteristics that made from fresh fruit; said method comprising the cutting of the peeled and cored fruit into squares of predetermined size and as small at ¼ inch, so that a substantially uniform, subsequently to be achieved degree of dehydration of the pieces and a latter substantially uniform rehydration of them can be readily effected; then drying the diced product in a temperature not exceeding 150 degrees F. until the diced pieces of the product mass have an average moisture content of from 17% to 18%; then storing the partially dried product in a container until the moisture content of the diced pieces is substantially uniform; then screening the product in the presence of a water spray to remove any seeds and small pieces of foreign matter in the product, and at the same time rehydrate the diced pieces to a moisture content of from about 22½% to about 23½%; and finally packing the product in sealed containers for the user at approximately said last-mentioned moisture content.

4. The method of preparing segmented apples and pears so that the produce can be reconstituted uniformly by rehydration to simulate a fresh fruit product, and which will cook uniformly in pies to produce a cooked product which approximates in characteristics that made from fresh fruit; said method comprising the cutting of the peeled and cored fruit into squares of predetermined size and as small as ¼ inch, so that a substantially uniform, subsequently to be achieved degree of dehydration of the pieces and a later substantially uniform rehydration of them can be readily effected; then drying the diced product in a temperature not exceeding 150 degrees F. until the diced pieces of the product mass have an average moisture content of from 17% to 18%; then storing the partially dried product in a container until the moisture content of the diced pieces is substantially uniform; then washing the product with water to remove any small pieces of foreign matter and at the same time rehydrating it to a moisture content of from about 22½% to about 23½%, and packing it in sealed containers for the trade.

References Cited in the file of this patent

UNITED STATES PATENTS

| | | |
|---|---|---|
| 1,259,636 | King | Mar. 19, 1918 |
| 2,451,312 | Arenzo-Jones | Oct. 12, 1948 |
| 2,473,184 | Webb | June 14, 1949 |
| 2,541,859 | Callaghan et al. | Feb. 13, 1951 |
| 2,619,424 | Masure | Nov. 25, 1952 |